United States Patent
Krenzel

(10) Patent No.: US 6,655,396 B2
(45) Date of Patent: Dec. 2, 2003

(54) CLOSED LOOP PRESSURE WASHER SYSTEM WITH HYDRO-DYNAMIC CONTINUOUS FLUSH WASHING ASSEMBLY

(76) Inventor: Art Krenzel, 10505 NE. 285$^{th}$ St., Battleground, WA (US) 98604

( * ) Notice: Subject to any disclaimer, the term of this patent is extended or adjusted under 35 U.S.C. 154(b) by 0 days.

(21) Appl. No.: 09/792,374

(22) Filed: Feb. 23, 2001

(65) Prior Publication Data

US 2002/0117191 A1 Aug. 29, 2002

(51) Int. Cl.$^7$ ................................................ B08B 3/02
(52) U.S. Cl. .......................... 134/104.1; 134/104.4; 134/109; 134/123; 134/199
(58) Field of Search ........................... 134/104.1, 104.4, 134/109, 123, 198, 199

(56) References Cited

U.S. PATENT DOCUMENTS

| | | | | |
|---|---|---|---|---|
| 2,437,013 A | * | 3/1948 | Adams | 134/198 X |
| 3,949,772 A | * | 4/1976 | Hartmann | 134/104.4 X |
| 5,033,489 A | * | 7/1991 | Ferre et al. | 134/123 X |
| 5,535,766 A | * | 7/1996 | Edwards | 134/104.1 X |
| 5,673,715 A | | 10/1997 | Carter | |
| 5,785,067 A | | 7/1998 | Kosofsky | |
| 5,803,982 A | | 9/1998 | Kosofsky et al. | |
| 6,164,298 A | * | 12/2000 | Petter et al. | 134/104.4 |

FOREIGN PATENT DOCUMENTS

SU 710672 * 2/1980 .................. 134/109

* cited by examiner

*Primary Examiner*—Randy Gulakowski
*Assistant Examiner*—Joseph Perrin

(57) ABSTRACT

A closed loop pressure washing system including a pressure washer device for pressure washing an object having a contaminant, and for recovering the the contaminant. The pressure washing system includes a supporting mechanism arranged to support the object while a washing fluid is flowed over the object to remove the contaminant. A collection arrangement is included at least partially located below the supporting mechanism. The collection arrangement is further arranged to receive raw run-off fluid from the support mechanism. A flush assembly is arranged to at least periodically impinge rinsing fluid onto the supporting mechanism to hydro-dynamically sweep the contaminants collecting on the support mechanism into the collection system.

21 Claims, 3 Drawing Sheets

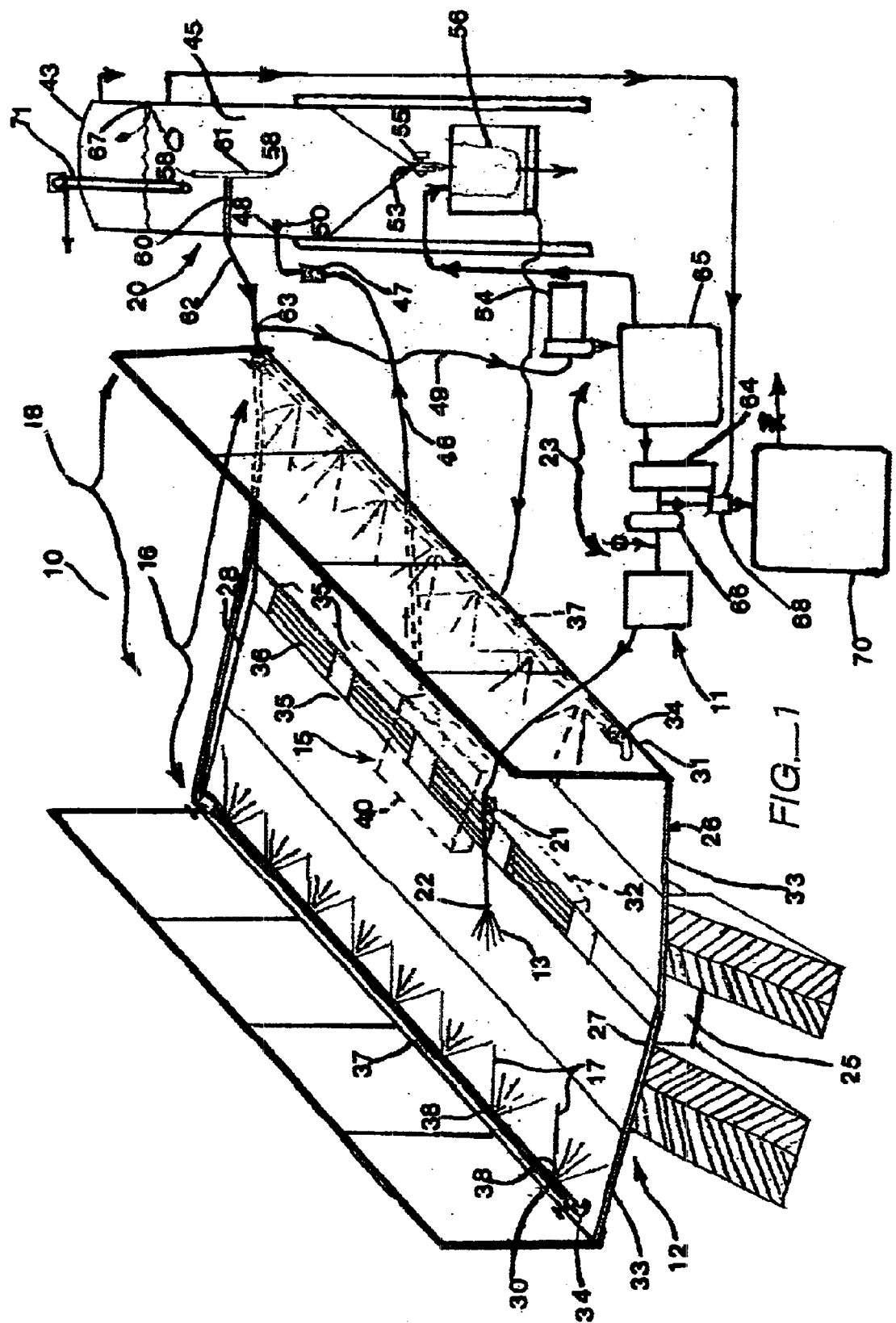
FIG._1

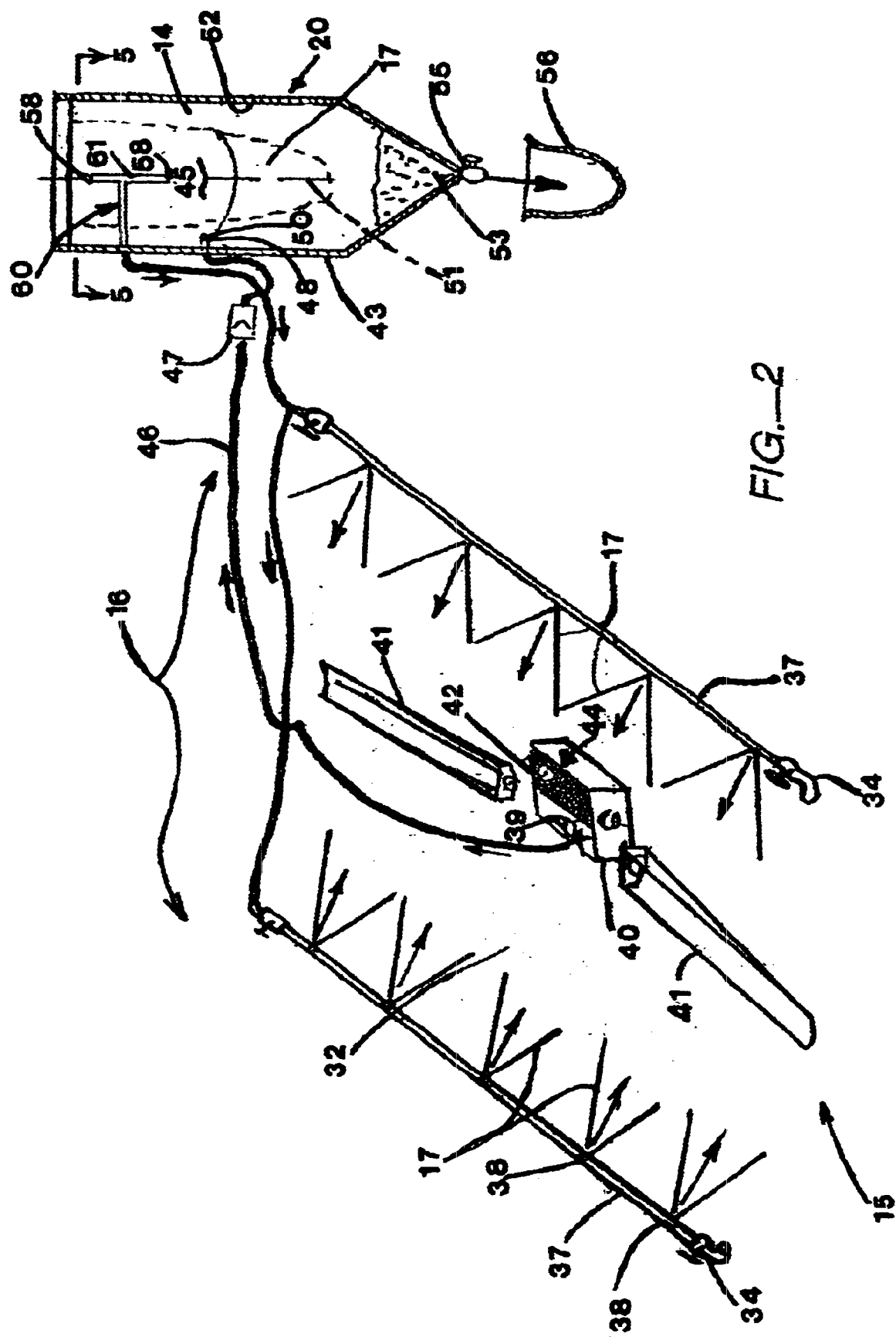
FIG._2

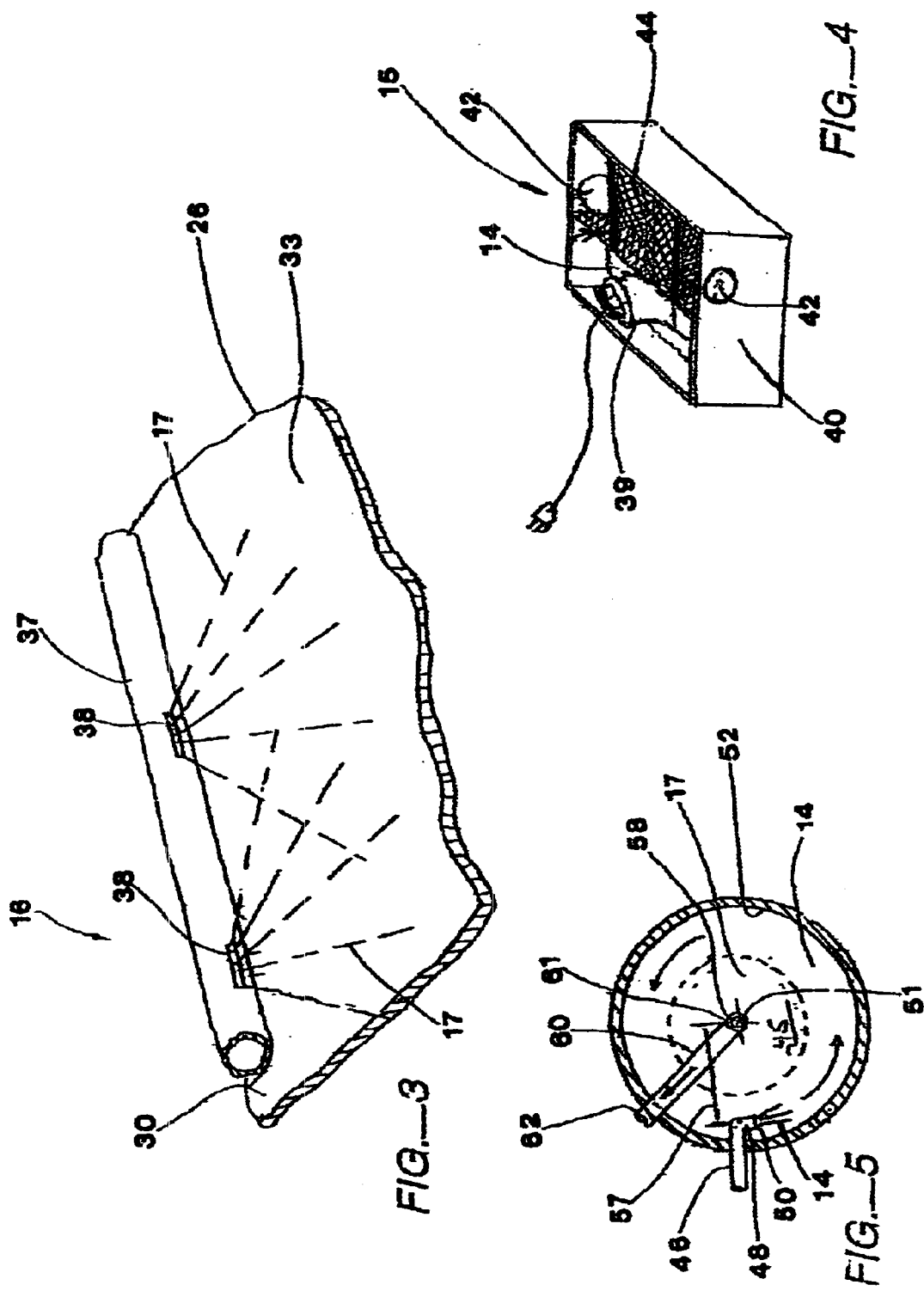

CLOSED LOOP PRESSURE WASHER SYSTEM WITH HYDRO-DYNAMIC CONTINUOUS FLUSH WASHING ASSEMBLY

BACKGROUND OF THE INVENTION

1. Field of Invention

The present invention relates generally to pressure washer apparatus, and more particularly, to methods and apparatus for separating and containing higher and lower-density contaminants from contaminated washing fluids for use in the pressure washing system.

2. Description of the Relevant Art

Contamination of the environment by man-made substances has been considered a serious world-wide problem. Recently, concern about contamination of earth, air, and groundwater by oil, toxic chemicals, and other hazardous wastes has expanded beyond large-scale industry to encompass the activities of many small businesses including automobile service stations, and many others. Both government regulations and social outcry have placed tremendous pressure on these businesses to avoid discharging hazardous wastes into the environment in the course of ordinary business activities.

Many businesses partake in activities which are likely to produce waste which may be harmful to the environment. For example, in an automobile service station, washing or steam-cleaning auto parts, e.g., an automobile engine, often causes engine oil, gasoline, and other chemicals to enter a storm drain system, or other waterways, thereby leading to the potential contamination of groundwater. In addition, those who service remotely located equipment generally have a need to wash the equipment without discharging hazardous waste into the environment. By way of example, persons who service roof-mounted air conditioners that contain lubricating petrochemicals, trapped pollutants, or other chemicals are not permitted to wash the equipment in a manner that could cause chemicals to run off the roof and into the surrounding environment.

To address these concerns, portable, closed-loop pressure washing equipment has become widely available which may recover oil, chemicals, and other hazardous materials from an object which is being washed. These pressure wash assemblies may efficiently recirculate, heat, and repeatedly filter a washing agent to minimize the quantity of waste material produced during a washing process. Typical of such systems are disclosed in U.S. Pat. Nos.: 5,673,715; 5,785,067 and 5,803,982, incorporated herein by reference.

These zero-discharge, closed-loop wash apparatus typically deploy a multi-step contaminant removal process designed to independently separate the heavier weight or higher density contaminants, relative the density of the washing fluid, as well as separate the lighter weight or lower density contaminants from the washing agent A collection basin of the wash apparatus, for example, may be configured to remove the heavier weight contaminants through the application of filtration baskets or through sediment settling of the coarser heavier sediments along the bottom of the collection basin. The medium weight or medium density contaminants, on the other hand, may remain suspended in the washing fluid, where they may be removed by filtration through micron filters or the like. In some designs, a succession of micron filters may be used to remove successively smaller particulates and molecules from the washing agent.

Typically, these portable pressure washing systems include a load bearing support mechanism which supports the object designated for cleaning above the collection basin. Often, these support mechanism include a porous grate device which enables the run-off wash fluids to flow easily therethrough directly into the collection below. While this grate material has adequate strength for small to medium weight objects, such a surface cannot be utilized for larger and heavier objects designated for cleaning, such as large earth moving vehicles. In this instance the support mechanism requires substantially solid metallic plate members sufficiently thick to carrying the bulk weight object.

While these solid surfaces provided excellent weight bearing properties, silting from the run-off wash fluid often occurs, especially when larger, coarser particulates or large volumes of contaminants are initially highly abundant. This collective silt build-up is problematic in that it often requires extensive manual cleanup or a prolonged cleanup time after the equipment has been washed. Accordingly, it would be desirable eliminate silting on these large support surfaces.

SUMMARY OF THE INVENTION

The present invention relates to a closed-loop pressure washing system having a pressure washer device to pressure wash an object having a contaminant, and for recovering the contaminant. The pressure washing system includes a supporting mechanism arranged to support the object while a washing fluid is flowed over the object to remove the contaminant. A collection arrangement is included at least partially located below the supporting mechanism. The collection arrangement is further arranged to receive raw run-off fluid from the support mechanism. A flush assembly is arranged to at least periodically impinge rinsing fluid onto the supporting mechanism to hydro-dynamically entrain or sweep contaminants collecting on the support mechanism into the collection arrangement.

The flush assembly is configured to preferably provide a continuous spray of the rinsing fluid along at least one side of the support mechanism toward the collection arrangement. The flush assembly also preferably includes an elongated dispensing member having a plurality of spaced-apart slits positioned along the one side, and arranged to generate and direct the spray of rinsing fluid toward the collection arrangement.

In one embodiment, the support mechanism includes a sloped top support surface to gravity flow the raw run-off fluid toward the collection arrangement. This is preferably provided by a top support surface which includes a lower side portion and an upper side portion, each extending from one end to an opposite end of the support surface. The collection arrangement includes a collection trough positioned substantially adjacent at least a portion of the lower side portion of the support surface for gravity flow collection of the raw run-off fluid therein. In this arrangement, the dispensing member is preferably positioned substantially adjacent at least a portion of the upper side portion of the support surface to provide a continuous or intermittent spray of rinsing fluid therealong toward the lower side portion.

In another aspect of the present invention, a separation assembly is provided for use with a closed-loop pressure washing system to separate contaminants from raw run-off fluid. The pressure washing system includes a pressure washing device arranged to deliver pressurized washing fluid and a collection arrangement to collect raw run-off fluid therein. The separation assembly includes a separation tank defining a storage cavity for storing reusable rinsing fluid therein. A delivery device includes a delivery port oriented to eject the raw run-off fluid into the storage cavity in a manner causing the reusable rinsing fluid therein to impart a rotational flow sufficient to enable centrifugal forces to assist in the separation of the contaminants out of the raw run-off fluid.

In one configuration, the separation tank includes a substantially cylindrical interior wall to define an upright substantially cylindrical storage cavity. The delivery device then extends into the storage cavity. The device is further arranged to eject the raw run-off fluid from the delivery port at a position or positions spaced-apart from and at an angle generally perpendicular to a longitudinal axis of rotation of the cylindrical storage cavity to impart the rotational flow.

In yet another embodiment, an intake device is included having an intake port positioned in the interior of storage cavity to draw rinsing fluid from the reusable rinsing fluid therein. The intake port is preferably positioned to draw the reusable rinsing fluid from proximate the longitudinal axis near the upper portion of the storage cavity.

The storage cavity preferably includes a conical-shaped bottom portion adapted to collect the separated contaminants from the raw run-off fluid. A valve assembly is in flow communication with the conical bottom portion to enable venting of the collected contaminants therethrough.

In another aspect, a method of contaminant separation and contaminant flushing is provided.

BRIEF DESCRIPTION OF THE DRAWINGS

The assembly of the present invention has other objects and features of advantage which will be more readily apparent from the following description of the Detailed Description of the Embodiments and the appended claims, when taken in conjunction with the accompanying drawings, in which:

FIG. 1 is a perspective view of a pressure washing system constructed in accordance with the present invention.

FIG. 2 is schematic representation a flush assembly and the separation assembly of the pressure washing system of FIG. 1.

FIG. 3 is an enlarged, top perspective view of a dispensing member of the flushing assembly of FIG. 1.

FIG. 4 is an enlarged, top perspective view of a raw run-off fluid containment tank of the separation assembly of FIG. 1.

FIG. 5 is an enlarged, top plan view, of the separation tank taken substantially along the plane of the line 5—5 in FIG. 1.

DETAILED DESCRIPTION OF THE PREFERRED EMBODIMENTS

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 1 and 2, where a closed-loop pressure washing system, generally designated 10, is provided having a pressure washer device 11 to pressure wash an object (not shown). The pressure washing system 10 includes a support mechanism 12 arranged to support the object while a washing fluid 13 is flowed over the object to remove contaminants thereon. A collection arrangement, generally designated 15, is included at least partially located below the support mechanism 12. The collection arrangement 15 is further arranged to receive raw run-off fluid 14 (FIG. 4) from the support mechanism 12. A flush assembly, generally designated 16, is arranged to at least periodically impinge rinsing fluid 17 onto the supporting mechanism to hydro-dynamically sweep contaminants collecting on the support mechanism 12 into the collection arrangement 15.

Accordingly, the support mechanism is flushed with rinsing fluid from the flush assembly for maintenance of the support surface of the support mechanism. Any silting or buildup of contaminant settling directly on the support mechanism can be flushed into the collection arrangement for the initial separation of the contaminants from the run-off fluid.

Briefly, it will be understood that the term "washing fluid" is applied to a washing agent used to wash contaminants from the surface of an object. For instance, water is the most typical washing agent, but may further include cleansing additives such as detergents, soda ash, etc. Moreover, the terms "lower-density contaminants" or "light weight contaminants" are referred to as contaminants with a specific gravity less than that of the washing fluid. Thus, the light weight contaminants naturally separate and float to the surface of the collected washing fluid. Such contaminants may include oil, gasoline, foams, plastics, ash, etc. In contrast, it will be understood that the terms "heavier-density contaminants" or "heavy weight contaminants" are referred to as contaminants with a specific gravity greater than that of the washing fluid. Finally, "medium-density contaminants" or "medium weight contaminants" are referred to as contaminants with a specific gravity similar to that of the washing fluid which may be suspended therein.

In the preferred embodiment, the closed-loop pressure washing system 10 includes a containment assembly 18 for containing and filtering the raw run-off fluid 14 for use with the flush assembly 16 and the pressure washer device 11. The containment assembly 18 includes the support mechanism 12 and a separation assembly 20, which as will be discussed, separates the light weight and heavy weight contaminants and larger medium weight contaminants from the raw run-off fluid 14 to produce the rinsing fluid. Collectively, the containment assembly 18 and the spray pressure washer device 11 cooperate to form the closed-loop pressure washing system 10.

As shown in FIG. 1, these spray pressure washing devices 11 provide a mechanism to pressure wash the object using a conventional pressure wand 21 and a compatible spray nozzle 22. Briefly, the pressure washer device 11 is coupled to the outlet side of a filter pack 23 to deliver filtered washing fluid to the pressure wand 21, via a pressure pump (not shown). The pressure pump be provided any conventional high pressure pump assembly, and is preferably capable of delivering a variable pressure for a selective pressure spray application. One such conventional pressure pump, for example, is that provided by WANNER, Model No. MD3EABJSSECA, which is capable of providing a low pressure spray in the range of about 50 psi and a high pressure spray in the range of about 3000 psi. Moreover, the containment assembly may heat the washing agent to a substantially high temperature in the range of about 80° F. to about 212° F., and more preferably in the range of about 140° F. to about 160° F.

Briefly, the support mechanism 12 includes a subfloor frame assembly 25 supporting a support floor 26 thereatop.

This support floor 26 provides a load bearing surface, and is preferably a solid metal plate material of about 1/8 inch to about 3/4 inch in thickness. Such a solid support floor arrangement, together with the frame assembly 25, can sustain very large, heavy equipment such as loaders, trucks, tractors, etc. placed thereatop. Further, to facilitate sufficient traction, the support floor is constructed of diamond plate carbon steel which has been sandblasted, and surfaced with an epoxy paint. Large grained sand may be incorporated with the paint to enhance the non-skid work surface quality as well.

Preferably the support floor 26 is substantially rectangular-shaped having opposed ends 27, 28, and opposed sides 30, 31. In the preferred embodiment, the support floor 26 is substantially V-shaped extending from one end 27 to the opposite end 28 thereof. At the basin or valley of the V-shaped support floor 26 is an elongated collection trough 32 (FIGS. 1 and 2) of the collection arrangement 15 preferably spanning the support floor 26 from one end 27 to the opposite end 28 thereof. The collection trough 32 separates the support floor 26 into a pair of opposed sloped surface portions 33, 33' each extending from the one end 27 to the opposite end 28 thereof. As viewed, each sloped surface portion 33, 33' includes an upper side portion (which coincides with opposed ends 27, 28) and a lower side portion 35, 35', and is oppositely sloped to form the V-shaped support surface. Preferably, the slope or grade of sloped surface portions 33, 33' toward the collection trough 32 is in the range of about 1° to about 4°. It will be understood, however, that the support floor may be a singularly sloped from the one side 30 to the opposite 31 thereof with the collection trough at its lower end. The floor could be sloped from the center to a trough at the edges as well (not shown).

The collection trough 32 is positioned adjacent to each lower side portion 35, 35', and includes a first grate device 36 to filter out very large, coarse contaminant such as large rocks. The grate device 36 is preferably composed of a metallic material, and is sized to retain any contaminants having a dimension greater than about 1.0 inch.

Accordingly, once the pressure washer device 11 flows the washing fluid 13 over the object to be cleaned, the contaminant laden raw run-off fluid 14 flows upon the sloped surface portions 33, 33' where it is diverted and gravity flowed toward the collection trough 32. Depending upon the grate size, the larger, coarser contaminants are retained by the grate device 36, while most of the remaining raw run-off fluid 14 flows therethrough into the collection trough.

However, as mentioned, there is often substantial silting build-up on the sloped support surface portions 33, 33', especially when the object being washed has a high concentration of contaminants initially washed therefrom. As mentioned, this build-up is problematic in that it often requires extensive manual cleanup or a prolonged cleanup time after the equipment has been washed.

In accordance with the present invention, as shown in FIGS. 1–3, the flush assembly 16 at least periodically sprays or flows rinsing fluid 17 onto the sloped surface portions 33, 33' of the support mechanism 12 to hydro-dynamically sweep contaminants collecting thereon into the collection trough 32. More preferably, the flush assembly 16 delivers a continuous flow of rinsing fluid 17 across the support surface, and into the collection assembly. By providing a continuous flow of rinsing fluid across the top surface, the solid contaminants become entrained in the flowing rinse fluids without "silting" out and depositing on the floor of the sloped support portions. The flow could be intermittent, however.

The flush assembly 16 includes a pair of elongated fluid dispensing members 37, 37' disposed longitudinally along the respective upper side portions 27, 28' of the sloped surface portions 33, 33'. More preferably, these dispensing members 37, 37' are oriented substantially adjacent and parallel to the top surfaces thereof in a manner directing the spray generally parallel to the respective slope of the top surface.

As best viewed in FIGS. 2 and 3, each dispensing member 37, 37' includes a plurality of spaced-apart openings 38 facing toward the collection trough 32. These openings 38 are preferably provided by slits extending generally parallel to the top surface of the respective sloped surface portions 33, 33'. Thus, as the rinsing fluid is dispensed from the slits 38 in a direction toward the collection trough 32, it impinges the respective top surfaces to dislodge any built-up silt, and entrain or urge it toward the collection trough.

Moreover, the slits 38 are preferably placed proximate the middle of the dispensing member so that the initial expulsion from the slit is generally parallel to the surface portions. It has been found that silting of the openings 38 may occur when they are placed too low (i.e., near the sloped surface portions 33, 33'), and that plugging of the openings 38 may occur when they are placed too high (i.e., near the top portions of the dispensing members 37, 37") by lighter weight contaminants, such as plastics. Thus, the end of the dispensing members 37, 37' each include a dump valve 34, 34' to flush or release the accumulation of debris or contaminants therefrom.

Preferably, each slit 38 is about 1/16 inch to about 2.0 inch in length, and about 1/100 inch to about 1/2 inch in height, and more preferably is about 1.0 inch in length and about 1/8 inch in height. Moreover, each slit is spaced-apart, centerline-to-centerline a distance in the range of about 1.0 inch to about 36.0 inches, and more preferably is about 12.0 inches apart. Depending upon the fluid pressure, each slit 38 is capable of fluid ejection therefrom at a rate of about 1/10 gal/min to about 25.0 gal/min, and more preferably is about 2.0 gal/min.

Once the raw run-off fluid flows into the collection trough 32, the raw fluid run-off is directed to a centrally located raw containment tank 40 (FIGS. 2 and 4) of the collection arrangement 15. This central containment tank 40 collects the raw run-off fluids 14 for processing in the next stage of the contaminant separation, to be discussed. To facilitate directional flow of the collected fluid run-off into the containment tank 40, the collection trough 32 is preferably provided by a pair of mirror image collection trough portions 41, 41', each having opposed ends sloped toward containment tank 40. Preferably, the slope or grade of the collection trough 32 toward the containment tank is in the range of about 1° to about 4°. Accordingly, the raw run-off fluid passes through the first grate device 36 and into the opposed collection trough portions 41, 41', the fluid is collected and directed through ports 42, 42' in the containment tanks for collection thereof.

To further separate the contaminants according to weight and size. The containment tank 40 includes a screened rock box 44 having a finer screen spacing than that of the first grate device 36 covering the collection trough 32. Medium sized contaminants passing through the spacing in the first grate device 36, but larger than spacing in between the screened rock box 44 are captured therein. Preferably, the rock box 44 will retain solid contaminants of 1/8 inch or greater.

This rock box 44 is supported atop the containment tank 40, and positioned such that the flow of the raw run-off fluid exiting the ports 42, 42' passes therethrough. This rock box 44 is also easily removed from the containment tank so that it can be periodically emptied of its contaminant contents. This is performed during daily maintenance by personnel.

A sump pump 39 is employed to transfer the collected fluid to a separation assembly 20, to be discussed. As shown in FIGS. 1 and 2, the sump pump 39 is fluidly coupled, and positioned, between the containment tank 40 and the separation assembly 20. Depending upon the contaminant loading, the pumping capacity of the sump pump 39, the volumetric size of the containment tank 40 can be selected accordingly. That is, by controlling the flow rate of the rinsing fluid passing across the sloped support portion 33, 33', and by operating the sump pump 80% to 90% of the time, solids can be substantially prevented from "settling out" in the raw water containment tank 40. Alternatively, a fload controller by-pass line can be introduced to increase the pump duty cycle to near 100%.

In accordance with another aspect of the present invention, as mentioned, a contaminant separation assembly 20 is provided fluidly coupled to the collection arrangement 15 for deposition of the raw run-off fluid 14 therein. The separation assembly further separates portions of the contaminant from raw run-off fluid reusable rinsing fluid 17 for reuse through the flush assembly 16. More preferably, as shown in FIGS. 2 and 5, the separation assembly includes a separation tank 43 defining a storage cavity 45 for deposition of the pumped raw run-off fluid therein. After processing, this stored reusable rinsing fluid 17 supplies the flush assembly 16 with the rinsing fluid 17, and the pressure washer device 11 with washing fluid 13.

A pump line 46 or hose fluidly couples the sump pump 39 to the separation tank 43 for delivery of the pumped raw run-off fluid. A one-way check valve 47 prevents flow back from the separation tank back to the containment tank 40. To fluidly communicate with the separation tank, a delivery device 48 extends into the tank storage cavity 45 for delivery of the pumped raw run-off fluid through a delivery port 50. By configuring the delivery of the raw run-off fluid through the delivery port and into the storage cavity 45 of the separation tank 43 in an agitating manner, selected portions of the contaminants in the run-off fluid can be separate out to provide reusable rinsing fluid 17 for the flush assembly 16 and the pressure washer device 11. As will be apparent, the agitation is preferably provided by rotational flow the raw run-off fluid which generates centrifugal forces to assist in the separation of portions of the contaminants.

In the preferred embodiment, the storage cavity 45 is in the shape of a vertically oriented or upstanding cylinder. As best viewed in FIG. 5, the circular transverse cross-sectional dimension facilitates rotational flow of the dispensed raw run-off fluid about a rotational axis 51. Upon sufficient rotational speed, the centrifugal forces urged upon the heavier contaminants cause them to separate out of the raw run-off fluid to produce the reusable rinsing fluid. At this separation stage, contaminants having weights greater than about 60 lb/ft$^3$ are caused, via the centrifugal forces, to be urged toward the cylindrical interior side walls 52 defining the storage cavity 45. As these contaminants impinge the side walls 52, gravitational forces cause these separated heavier contaminants to slide down the side walls toward the bottom portions of the storage cavity 45 where they accumulate.

To collect the separated contaminants in the storage cavity 45, the bottom portion thereof is tapered inwardly. More preferably, the bottom portion is conical-shaped narrowing to a small diameter mouth portion 53 (preferably about 4 inches in diameter) where the contaminants collect. A valve device 55 having a large bore opening is preferably positioned at the mouth portion 53 to enable selective venting of the collected contaminants therethrough into a disposable filter bag 56 positioned on the other side. Preferably, the valve device 55 is provided by a rapidly opening, ball valve or pneumatically assisted valve which may be periodically operated manually or automatically when the separated solid contaminants sufficiently accumulate at the conical bottom portion.

As the accumulated slurry flows through the valve device 55 into the filter bag 56, the solid contaminants are separated from rinsing fluid 17. This filtered fluid is then returned to the wash pad. The filtered solids are retained in the filter bag for appropriate disposal. The draining of the solids from the bottom of the storage cavity 45 can be automated which reduces manual maintenance and operation, and ensures the periodic removal therefrom.

In accordance with the present invention, the rotational flow of the raw run-off fluid contained in the storage cavity 45 is induced by a directional injection of the pumped raw run-off fluid 14 therein. By arranging the delivery device 48 to eject the raw run-off fluid from the delivery port 50 at positions spaced-apart from and at an angle generally perpendicular to a longitudinal axis 51 of rotation of the cylindrical storage cavity 45, rotational flow is imparted. To produce the greatest rotational force (moment), the delivery port 50 is preferably positioned substantially adjacent to the peripheral interior wall 52 (FIG. 5), and proximate the vertical middle portion of the separation tank 43 (FIG. 2). Since this position is generally about the furthest distance from the longitudinal axis 51, a greater radial moment arm 57 is created.

Preferably, the delivery device 48 is in the shape of a 90° elbow joint which positions the delivery port 50 substantially perpendicular to the imaginary radial moment arm 57, to impart of rotational forces along the periphery of the interior walls 52. As the fluid is jettisoned from the delivery port 50, it entrains more fluid and imparts a rotation to the entire mass of water in the storage cavity 45. The circulatory motion of the fluid produces the centrifugal force assisting the heavier solids to separate from the pumped raw run-off fluids, and settle to the bottom of the cone portion.

The continuous centrifugal forces urged upon the contained fluid in the storage cavity 45 produces substantially cleaner rinsing fluid 17 proximate to the upper center portion of the cylindrical storage cavity 45. Thus, a fluid intake port 58 of an intake device 60 is positioned in that region to draw the cleaner rinsing fluid therefrom. More preferably, the intake device 60 is centrally positioned at the fluid rotational axis 51, which of course is substantially co-axial to the longitudinal axis of the cylindrical storage cavity 45. To increase the capacity without substantially impeding the rotational flow, the intake device 60 includes an anti-siphoning shaft 61 extending substantially co-axial with the axis 51 of rotation. As best viewed in FIG. 2, the anti-siphoning shaft 61 intakes the reusable rinsing fluid 17 from a pair of opposed intake ports 58, 58' positioned at opposed ends thereof. The top intake port 58 is included to release trapped air in the flush line as well as to prevent siphoning of inadequately treated water from the cylindrical storage cavity 45. It will be appreciated, however, that the intake port may be provided by a plurality of spaced-apart apertures (not shown) located along the anti-siphoning shaft without departing from the true spirit and nature of the present invention.

In the preferred form, the fluid intake device 60 is fluidly coupled to the flush assembly 16 through a flush line 62 which provides the continuous resource of rinsing fluid 17 for the dispensing members 37, 37'. By positioning the separation tank 43 vertically above the dispensing members 37, 37' by a sufficient amount, a pressure head may be generated at the dispensing member slits 38 to dispense the rinsing fluid therefrom. Preferably, this vertical distance is in the range of about 3 feet to about 15 feet, producing a pressure head in the range of about 1.5 psi to about 7.5 psi. However, a pressure pump may be introduced between the intake device and the dispensing members 37, 37' to provide the dispensing pressure.

Referring back to FIG. 1, the washing fluid 13 for the pressure washer device 11 is preferably provided by diverting a portion of the reusable rinsing fluid 17 from the flush line 62 at Y-joint 63. This diverted portion of the rinsing fluid passes through a delivery line 49 to a distribution pump 54. Normally, the distribution pump 54 pressure feeds the diverted rinsing fluid through a conventional 20 micron bag filter 64 of the filter pack 23 for additional filtering prior to storage in a pressure tank 66. Optionally, with heavier dirt and oil loading, the fluid can flow through an oil/water separator or a backflush sand filter 65 (depending upon the situation), and subsequently, through the conventional 20 micron bag filter 64. The washing fluid 13 is then pressure fed into the high pressure washer pump (not shown) of the pressure washer 11, above-indicated, and used again through wand 21 to wash the objects. The washing fluid, preferably water, contains dissolved solids which appears as dirty water. However, this solution is sufficient for first stage washing again if desired.

A fresh water rinse is provided for final rinsing of the equipment, and can be added manually or automatically when fluid in the separation tank becomes too low. On the other end, since the system operates as a fixed volume, closed loop system, too much fluid in the separation tank will require removal before an overflow situation occurs. Thus, a safety overflow 67 is provided to dispense overflow fluid to a drain or waste source. In one embodiment, a float controlled solenoid valve 68 periodically delivers fluids to an organo-clay filter 70 for disposal via the community sewer systems.

If oils are being washed off without soap, mechanical oil skimming should be sufficient to dispose of the water to sewer. However, if the oils are intensely mechanically emulsified, oleiophilic surfaces can be used to reclaim the majority of the oils. If the oils are chemically emulsified, a specially designed clay or carbon filter is used to remove the oils below the sewer districts acceptance levels. Any time oils are being washed, it is prudent to discharge the water through an organo-clay filter prior to being dumped to sewer.

There are specific soaps called "quick release soaps". When these soaps are used to wash items covered with oils, the quick release soaps retain the oils in solution as long as the fluid is in motion. When the oil emulsified water reaches a quiet location for several minutes, the majority of the oil is released and collects on the surface of the water. This quiet location also allows the solids to separate from the water by gravity. Because 100% oil release cannot be guaranteed in the time available in the system, it is always prudent to run the water through a clay or carbon filter designed to remove oils from the water stream prior to disposal down the sewer.

Additionally, oil skimmer 71, located at the top of the separation tank and into the storage cavity 45, removes the free floating oil and directs it to a bucket for disposal.

When there are high dirt or oil loads, the separation tank size can be increased to improve the recycle fluid retention time. A larger tank will allow more time for the "quick release soaps" to release the dirt and oils before the water is recycled back onto the floor of the wash pad.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A closed-loop pressure washing system for pressure washing an object having a contaminant with a pressure washer device, and for recovering the contaminant, the apparatus comprising:

a supporting mechanism arranged to support the object while a washing fluid is flowed over the object to remove the contaminant;

a collection arrangement at least partially located below the supporting mechanism, and arranged to receive the raw run-off fluid from the supporting mechanism; and a flush assembly arranged to at least periodically spray rinsing fluid onto said supporting mechanism to hydrodynamically entrain or sweep contaminants collecting on said support mechanism into said collection arrangement and, said support mechanism includes a pair of opposed sloped surface portions each extending from one end to an opposite and thereof, and each including and upper side portion and a lower side portion arranged to collectively form a V-shaped top support surface and, said collection arrangement having a collection trough positioned substantially adjacent to at least a portion of each said lower side portion of the respective sloped surface portion for gravity flow collection of the raw run-off fluid therein, and said flush assembly includes a pair of elongaged dispensing members each positioned substantially adjacent to at least a portion of a respective upper side portion of the sloped surface portion to provide a continuous spray of rinsing fluid therealong toward the lower side portion of the respective sloped surface portion.

2. The closed loop pressure washing system as defined in claim 1, wherein said flush assembly is configured to provide a continuous spray of said rinsing fluid along at least one side of the support mechanism toward the collection arrangement.

3. The closed-loop pressure washing system as defined in claim 1, wherein said flush assembly includes an elongated dispensing member having a plurality of spaced-apart-openings positioned along one side, and arranged to generate and direct said spray of rinsing fluid towards said collection arrangement.

4. The closed-loop pressure washing system as defined in claim 3, wherein said elongated dispensing member is positioned substantially adjacent and parallel to a top support surface of the support mechanism.

5. The closed loop pressure-washing system as defined in claim 3, wherein said openings are provided by slits extending along the elongated dispensing member substantially adjacent and parallel to a top support surface of the support mechanism.

6. The closed-loop pressure washing system as defined in claim 1, wherein
said support mechanism includes a sloped top support surface to encourage gravity flow of the raw run-off fluid toward said collection arrangement.

7. The closed-loop pressure washing system as defined in claim 6, wherein
said top support surface includes a lower side portion and upper side portion, each extending from one end to an opposite end of the support surface,
said collection arrangement having a collection trough positioned substantially adjacent at least a portion of said lower side portion of the support surface for gravity flow collection of the raw run-off fluid therein, and
said flush assembly includes an elongated dispensing member positioned substantially adjacent at least a portion of said upper side portion of the support surface to provide an intermittent or continuous spray of rinsing fluid therealong toward said lower side portion.

8. The close-loop pressure washing system as defined in claim 1, wherein
each elongated dispensing member includes a plurality of spaced-apart slits positioned along the respective upper side portion, and arranged to generate and direct said spray of wash fluid toward said collection arrangement.

9. The closed-loop pressure washing system as defined in claim 1, further including:
a separation assembly fluidly coupled to said collection arrangement for deposition of said raw run-off fluid therein in a manner separating the portions of the contaminant from reusable rinsing fluid for reuse through said flush assembly.

10. The closed-loop pressure washing system as defined in claim 9, wherein,
said separation assembly includes a separation tank defining a storage cavity for storing reusable rinsing fluid therein, and a delivery device fluidly coupled to said collection arrangement and having a delivery port adapted to deliver the raw run-off fluid into said storage cavity of the separation tank in an agitating manner assisting said portions of the contaminant to separate out from the reusable fluid delivered in said storage cavity.

11. The closed-loop pressure washing system as defined in claim 10, wherein
said flush assembly includes and elongated dispensing member having a plurality of spaced-apart slits positioned along at least one side of the support mechanism, and arranged to generate and direct said spray of rinsing fluid toward said collection arrangement.

12. The closed-loop pressure washing system as defined in claim 11, wherein
said separation tank is positioned above said dispensing member for gravity flow of the rinsing fluid from the separating tank to the dispensing member.

13. The closed-loop pressure washing system as defined in claim 10, wherein
said delivery device is configured to eject the raw run-off fluid into said storage cavity in a manner causing said reusable rinsing fluid therein to impart a rotational flow sufficient to enable centrifugal forces to assist the separation of heavier contaminants out of said raw run-off fluid.

14. The closed-loop pressure washing system as defined in claim 13, wherein
said separation tank includes a substantially cylindrical interior wall to define and upright substantially cylindrical storage cavity, and
said delivery device extends into said storage cavity, and is arranged to eject the raw run-off fluid from said delivery port as a position or positions spaced-apart from and at an angle generally perpendicular to a longitudinal axis of rotation of the cylindrical storage cavity to impart said rotational flow.

15. The closed-loop pressure washing system as defined in claim 14, wherein
said delivery port is positioned substantially adjacent to said interior wall.

16. The closed-loop pressure washing system as defined in claim 14, wherein
said flush assembly includes an intake port positioned in the interior of the storage cavity to draw from the reusable rinsing fluid therein.

17. The closed-loop pressure washing system as defined in claim 16, wherein
said intake port of the flush assembly is positioned to draw the reusable rinsing fluid from the proximate longitudinal axis of the storage cavity.

18. The closed-loop pressure washing system as defined in claim 14, wherein
said storage cavity includes a bottom portion smoothly tapering inwardly toward a mouth portion for the collection of heavier separated contaminants therein.

19. The closed-loop pressure washing system as defined in claim 18, wherein
said bottom portion is conically-shaped.

20. The close-loop pressure washing system as defined in claim 18, further including:
a valve assembly in flow communication with the conical bottom portion to enable rapid venting of the collected contaminants therethrough.

21. The closed-loop pressure washing system as defined in claim 16, further including:
a pressure washing assembly in flow communication with said intake port to also the washing fluid therefrom.

* * * * *